Nov. 1, 1932.  S. T. WILLIAMS  1,886,072
STREAMLINE WIRE SEPARATOR
Filed Nov. 14, 1929
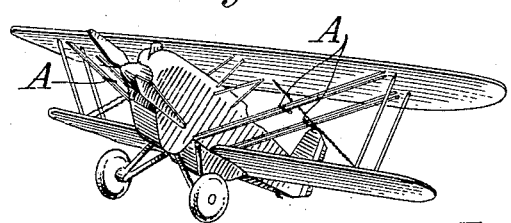
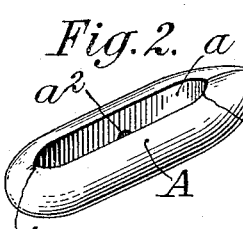
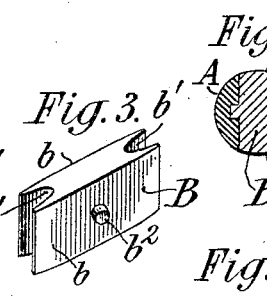
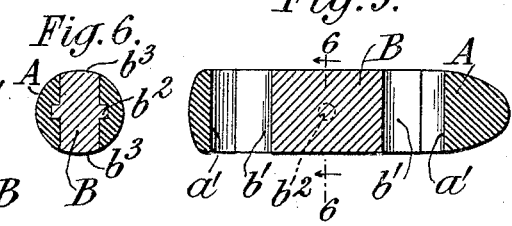
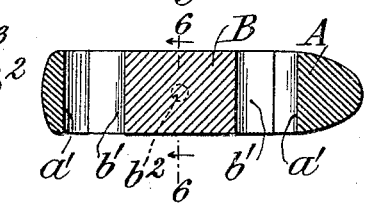
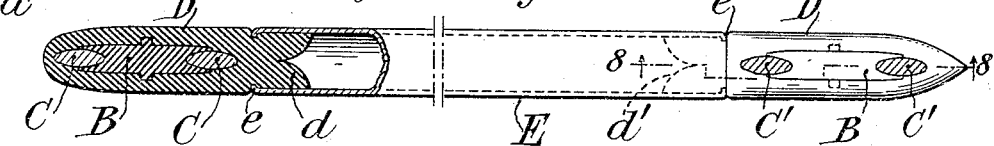
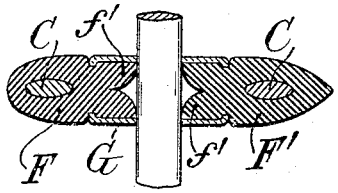
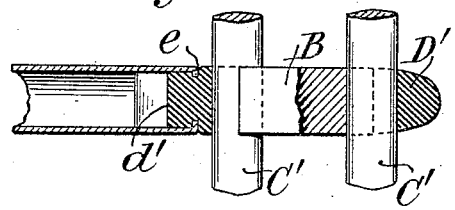
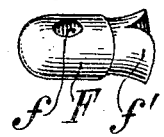
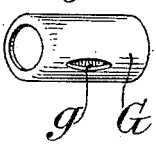
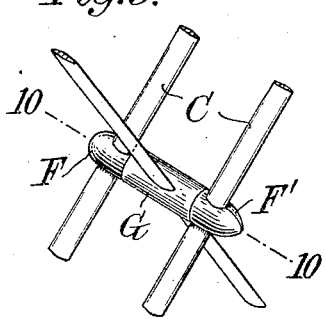
INVENTOR:
Selden T Williams,
By Attorneys,
Fraser, Myers & Manley.

Patented Nov. 1, 1932

1,886,072

UNITED STATES PATENT OFFICE

SELDEN T. WILLIAMS, OF FOREST HILLS, NEW YORK, ASSIGNOR TO A. SCHRADER'S SON, INCORPORATED, OF BROOKLYN, NEW YORK, A CORPORATION OF NEW YORK

STREAMLINE WIRE SEPARATOR

Application filed November 14, 1929. Serial No. 407,052.

The present invention relates to a streamline wire separator adapted for use as an aircraft accessory for restraining a plurality of aircraft wires in flight, from vibrating or fluttering.

Heretofore the means for restraining fluttering in aircraft wires in flight consisted either of taping together said wires around spacing block with adhesive or friction tape, or in using a lathe-turned peg formed of spruce, aluminum or the like, which is cut in half through its major axis and grooved to receive the wires, the severed portions of the peg being secured together with a wood screw or equivalent means. These means are expensive to make, they do not possess resiliency to maintain the strain on the wires when affected by moisture, etc., and for other reasons have been found not entirely satisfactory.

According to the present invention I provide a simple, economical and practical means for overcoming the inherent defects in wire separators for aircraft as heretofore employed, which can be quickly applied in place upon the wires and which will reduce vibration or fluttering in the wires to a minimum. The means which I have devised, it will be apparent from the detailed description which follows, are applicable for restraining fluttering in the flying and landing wires, particularly where said wires are mounted in pairs. It may also be advantageously employed where said wires are crossed and for simultaneously holding the wires in the front and rear bays of aircraft against independent vibration or fluttering.

In its general aspect the invention comprises spacer means and means for encompassing the wires and the spacer means, one of said means being adapted to tension the wires against the other of said means. More specifically, it comprises elastic means for engaging the wires, and spacer means for cooperating with said elastic means.

Various adaptations of the invention are illustrated in the accompanying drawing, wherein Figure 1 is a perspective view of an airplane to which the invention is applied.

Fig. 2 is a perspective view of the elastic element of the wire separator constituting one embodiment of my invention.

Fig. 3 is a perspective view of the spacer element used in conjunction with the elastic element shown in Fig. 2.

Figs. 4 and 5 are a horizontal longitudinal and a vertical longitudinal section respectively of the wire separator shown in Figs. 2 and 3.

Fig. 6 is a section taken substantially along the plane of the line 6—6 of Fig. 5.

Fig. 7 is an elevation partly in section of an interstrut adaptation of the present invention.

Fig. 8 is a section taken substantially along the broken line 8—8 of Fig. 7.

Fig. 9 is a perspective view of a further embodiment of my invention adapted for use with crossed wires.

Fig. 10 is a section taken substantially along the plane of the line 10—10 of Fig. 9.

Figs. 11, 12 and 13 show perspective views of the component parts of the wire separator shown in Fig. 9.

Referring first to Figs. 1 to 6, the wire separator consists of an elongate elastic member A formed with a longitudinal slot $a$ extending therethrough, within which is positionable a spacer element B. The walls of the slot in the member A are substantially flat throughout the major portion of their length and converge toward each other and meet at their ends, as indicated at $a'$, and substantially centrally thereof are formed with recesses $a^2$. The elastic member A is preferably streamline in form, and the normal distance between the ends of the slot $a'$ is less than the distance between the outer edges of the parallel wires with which it is adapted to cooperate, so that said elastic member will be stretched or tensioned when in applied position over said wires. Preferably the elastic member A is fabricated in its finished form by formation in a mold in any well known manner.

The spacer element B, which is preferably formed of rigid material, has substantially flat, parallel side walls $b$, $b$, and grooved end walls $b'$, $b'$, and has projections $b^2$ centrally projecting from the faces $b$, the projections $b^2$ being adapted to engage and seat within the recesses $a^2$ formed in the inner walls of the member A. The thickness of the element B is approximately the same as the width of the slot $a$, but preferably is made slightly greater than the width of said slot so as to provide increased tension on the side walls of the spacer element when the elastic member is tensioned over a pair of wires. The top and bottom walls $b^3$, $b^3$ are transversely curved, as shown in Fig. 6, so as to carry forward the stream lining of the wire separator as a whole. The spacer element may be formed of any desired material, such as wood, hard rubber, bakelite, duralumin, etc.

It will be apparent from an inspection of Fig. 4 that the openings provided for the reception of the wires by the assembly of the member A and element B are not of either circular or true elliptical outline. However, as aircraft wires to which the present device is applicable are usually of substantially elliptical cross-section, it will be apparent that when the member A is tensioned over such wires the ends $a'$ of the recess will assume the contour of the wire, and the engagement between the elastic member and the spacer element will be substantially as shown in Fig. 7. In practice, in the use of the wire separator as thus described, the member A is first applied over the wires to its desired position, whereupon the spacer element B is positioned between the wires and snapped into place into the member A. The frictional grip upon the wires thus brought about will be sufficient to hold the device in fixed position upon the wires while the aircraft is in flight.

In Figs. 7 and 8 I have shown an interstrut adaptation of the present invention whereby parallel wires C, C and C', C' in the front and rear bays respectively of an aircraft may be held in true parallelism against independent vibration in flight. To accomplish this, elastic members D and D' substantially the same as shown in Figs. 1 to 6, are employed. The member D is formed with a substantially fan-tailed end $d$, and the member D' with a correspondingly shaped end $d'$ and over said ends there is fitted a tubular element E formed of fiber, duralumin or the like, the ends of said tube being turned inwardly as shown at $e$. The resiliency of the fan-tail ends, which are normally of slightly larger diameter than the bore of said tubular element, serve to hold said tubular element upon said ends in a manner such that the tubular element will be adapted to swivel with respect to the members D and D'.

In Figs. 9 to 13 I have shown a further embodiment of my invention adapted for use with crossed wires. As shown in said figures, the separator consists of a head portion F, a tail portion F' and a tubular separator element G, said elements when mounted in co-operative relation being of stream line form, as will be apparent from an inspection of Fig. 9. The members F and F', which are preferably formed of elastic material, are each provided with an opening $f$ therethrough of normally round cross-section, which, when stretched or forced over the wires, are caused to assume the contour of the wires and hold tightly thereon. The members F and F' are provided with fan-tail-like ends $f'$, $f'$ similar to those previously described, and adapted for cooperation with the ends of the tubular member G to swivelly hold the same in assembled relation on the members F and F'. The tubular member G is formed with an opening $g$ centrally therethrough through which the crossed wire loosely passes. In view of the swivel mounting of the spacer tube G and the members F and F', it will be apparent that the device readily lends itself to crossed wires having different angularities.

From the foregoing description it will be apparent that although I have shown and described various embodiments of my invention and the manner in which the same may be made and assembled, and the materials from which the various parts may be formed, it is to be understood that I do not wish to be limited to said details of construction and limitations, since the invention is susceptible of general applicability and that modifications and changes in the embodiments disclosed may be resorted to without departing from the spirit of the invention.

What I claim is:

1. A device for restraining a plurality of aircraft wires from fluttering, which comprises elastic means for engaging the wires and spacer means cooperating with the elastic means, said elastic means comprising a head portion and a tail portion, which, in their cooperative relation, are streamline in form.

2. A device for restraining a plurality of aircraft wires from fluttering, which comprises a rigid spacer element and an elastic element for encompassing the wires and frictionally gripping them against the spacer element.

3. A device for restraining a plurality of aircraft wires from fluttering, which comprises a rigid spacer element and an elastic element for encompassing the wires and frictionally gripping them against the spacer element, said elastic element being of streamline form.

4. A device for restraining a plurality of aircraft wires from fluttering, which comprises a rigid spacer element and an elastic element for encompassing the wires and frictionally holding them against the spacer element, said elements having interengaging means for maintaining them in assembled relation.

5. A device for restraining a plurality of aircraft wires from fluttering, which comprises a rigid spacer element and an elastic element for encompassing the wires and frictionally holding them against the spacer element, said spacer element having projections, and said elastic element having recesses for cooperative engagement with said projections.

6. A device for restraining a plurality of aircraft wires from fluttering, which comprises elastic means for engaging the wires and spacer means cooperating with the elastic means, said spacer means being movable relatively to the elastic means about their common axis.

7. A device for restraining a plurality of aircraft wires from fluttering, which comprises elastic means for engaging the wires and spacer means cooperating with the elastic means, said elastic means comprising a head portion and a tail portion axially disposed with respect to each other, and the spacer means being mounted to swivel on the elastic means.

8. A device of the character described, comprising an elastic element having an opening therethrough adapted to receive a wire of smaller dimension than the opening, and a filler element insertable in said opening, the combined cross-sectional dimensions of the wire and the filler being greater than the normal length of the opening.

In witness whereof, I have hereunto signed my name.

SELDEN T. WILLIAMS.

CERTIFICATE OF CORRECTION.

Patent No. 1,886,072.   November 1, 1932.

SELDEN T. WILLIAMS.

It is hereby certified that error appears in the printed specification of the above numbered patent requiring correction as follows: Page 2, line 129, claim 4, for "holding" read "gripping"; and that the said Letters Patent should be read with this correction therein that the same may conform to the record of the case in the Patent Office.

Signed and sealed this 17th day of January, A. D. 1933.

(Seal)   M. J. Moore,
Acting Commissioner of Patents.